United States Patent
Whalley (10) Patent No.: US 9,946,445 B2
(45) Date of Patent: Apr. 17, 2018

(54) NAVIGATING TO FAILURES IN DRILLING SYSTEM DISPLAYS

(75) Inventor: Andrew James Whalley, Calgary (CA)

(73) Assignee: Landmark Graphics Corporation, Houston, TX (US)

(*) Notice: Subject to any disclaimer, the term of this patent is extended or adjusted under 35 U.S.C. 154(b) by 603 days.

(21) Appl. No.: 14/417,612

(22) PCT Filed: Aug. 10, 2012

(86) PCT No.: PCT/US2012/050365
§ 371 (c)(1),
(2), (4) Date: Jan. 27, 2015

(87) PCT Pub. No.: WO2014/025361
PCT Pub. Date: Feb. 13, 2014

(65) Prior Publication Data
US 2015/0193126 A1 Jul. 9, 2015

(51) Int. Cl.
*G06F 3/048* (2013.01)
*G06F 3/0484* (2013.01)
(Continued)

(52) U.S. Cl.
CPC ....... *G06F 3/04842* (2013.01); *E21B 44/00* (2013.01); *E21B 47/10* (2013.01)

(58) Field of Classification Search
CPC ........ E21B 47/006; E21B 12/03; E21B 47/09
See application file for complete search history.

(56) References Cited

U.S. PATENT DOCUMENTS

| | | | |
|---|---|---|---|
| 4,597,662 A | 7/1986 | Hirata et al. | |
| 5,202,680 A | 4/1993 | Savage | |

(Continued)

FOREIGN PATENT DOCUMENTS

| | | |
|---|---|---|
| RU | 2316820 C2 | 2/2008 |
| RU | 2373390 C2 | 11/2009 |
| RU | 2439315 C1 | 1/2012 |

OTHER PUBLICATIONS

Discovery House, Australian Government IP Australia, Patent Examination Report No. 1, Patent Application No. 2012387177, which is an AU counterpart to the instant application, Sep. 3, 2015.

(Continued)

*Primary Examiner* — Ryan F Pitaro
(74) *Attorney, Agent, or Firm* — Howard L. Speight, PLLC.

(57) ABSTRACT

A plurality of data records is stored in a memory. The data records include data about a drill string in a well. Each data record includes a depth zone, wherein the depth zone includes a range of depths in the well, a description of a component in the drill string in the depth zone for this data record, and a failure flag that, when set, represents a failure in the drill string at the depth zone for this data record. A processor with access to the memory generates and transmits for display on a graphical user interface a schematic of a portion of the drill string. The processor emphasizes on the schematic of the portion of the drill string on the graphical user interface a representation of an emphasized depth zone, wherein a failure flag in a data record for the emphasized depth zone is set.

17 Claims, 8 Drawing Sheets

(51) Int. Cl.
*E21B 44/00* (2006.01)
*E21B 47/10* (2012.01)

(56) References Cited

U.S. PATENT DOCUMENTS

| | | | |
|---|---|---|---|
| 5,532,715 A | 7/1996 | Bates et al. | |
| 5,973,663 A | 10/1999 | Bates et al. | |
| 6,206,108 B1* | 3/2001 | MacDonald | E21B 44/00 175/24 |
| 6,580,823 B1 | 6/2003 | Englefield et al. | |
| 6,760,665 B1* | 7/2004 | Francis | G01V 1/40 702/16 |
| 7,027,925 B2 | 4/2006 | Terentyev et al. | |
| 7,139,689 B2 | 11/2006 | Huang | |
| 7,357,196 B2 | 4/2008 | Goldman et al. | |
| 7,359,844 B2 | 4/2008 | Sung et al. | |
| 7,630,914 B2 | 12/2009 | Veeningen et al. | |
| 7,730,967 B2 | 6/2010 | Ballantyne et al. | |
| 7,747,628 B2 | 6/2010 | Tanzy | |
| 7,802,634 B2 | 9/2010 | Boone | |
| 8,237,714 B1* | 8/2012 | Burke | G06F 17/30572 345/440 |
| 9,141,720 B2* | 9/2015 | Zak | H04L 29/12009 |
| 2002/0139527 A1 | 10/2002 | Song et al. | |
| 2003/0015351 A1 | 1/2003 | Goldman et al. | |
| 2003/0025734 A1* | 2/2003 | Boose | G06F 17/509 715/765 |
| 2003/0234782 A1 | 12/2003 | Terentyev et al. | |
| 2004/0138818 A1 | 7/2004 | Shray et al. | |
| 2005/0063251 A1 | 3/2005 | Guidry et al. | |
| 2005/0279532 A1* | 12/2005 | Ballantyne | E21B 47/12 175/40 |
| 2006/0239118 A1* | 10/2006 | Guidry | G01V 1/34 367/68 |
| 2007/0067798 A1 | 3/2007 | Wroblewski | |
| 2007/0103324 A1* | 5/2007 | Kosuge | E03F 7/00 340/618 |
| 2008/0126049 A1 | 5/2008 | Bailey et al. | |
| 2010/0133008 A1* | 6/2010 | Gawski | E21B 7/04 175/45 |
| 2010/0147510 A1* | 6/2010 | Kwok | G01V 11/00 166/250.01 |
| 2011/0047503 A1 | 2/2011 | Allen et al. | |
| 2011/0214090 A1* | 9/2011 | Yee | G06Q 10/10 715/838 |
| 2012/0124477 A1* | 5/2012 | Edgar | G06Q 10/10 715/738 |
| 2012/0216117 A1* | 8/2012 | Arriola | H04N 21/4821 715/716 |
| 2013/0091432 A1* | 4/2013 | Shet | G08B 13/19645 715/719 |
| 2013/0341093 A1* | 12/2013 | Jardine | E21B 7/00 175/40 |
| 2014/0012506 A1* | 1/2014 | Adsit | E21B 44/00 702/6 |
| 2014/0118334 A1* | 5/2014 | Guijt | G06T 17/05 345/419 |
| 2014/0229877 A1* | 8/2014 | Adegbola | G06F 17/30 715/771 |
| 2015/0193126 A1* | 7/2015 | Whalley | E21B 44/00 715/733 |
| 2016/0162519 A1* | 6/2016 | Stowe | G06F 17/40 707/755 |

OTHER PUBLICATIONS

Intellectual Property Office of Singapore, Written Opinion, Application No. 11201408742Q, which is an SG counterpart to the instant application, Sep. 9, 2015.
European Patent Office, Communication—extended European search report, Application No./Patent No. 12882705.2-1610 / 2861822 PCT/US2012050365, which is an EP counterpart to the instant application, dated Feb. 23, 2016.
Intellectual Property Office of Singapore, Notification of Grant, Patent Application No. 11201408742Q, which is an SG counterpart to the instant application, dated Mar. 22, 2016.
Australian Government IP Australia, Patent Examination Report No. 2, Patent Application No. 2012387177, which is an AU counterpart to the instant application, dated Aug. 10, 2016.
Federal Service on Industrial Property, Official Action of substantive examination, Application No. 2015108061/03(012898), which is an RU counterpart of the instant application, dated May 4, 2016.
Federal Service on Intellectual Property, Search Report, Application No. 2015108061/03(012898), which is an RU counterpart of the instant application, dated May 4, 2016.
Translation of the Federal Service on Industrial Property, Official Action of substantive examination, Application No. 2015108061/03(012898), which is an RU counterpart of the instant application, dated May 4, 2016.
Australia Government IP Australia, Patent Examination Report No. 3, Patent Application No. 201238777, which is an AU counterpart to the instant application, dated Aug. 31, 2016.
English translation of Federal Service on Intellectual Property (Rospatent), Decision on Grant, Application No. 2015108061/03(012898), entire document, which is a RU counterpart to the instant application, Sep. 14, 2016.
Federal Service on Intellectual Property (Rospatent), Decision on Grant, Application No. 2015108061/03(012898), which is a RU counterpart to the instant application, entire document, Sep. 14, 2016.
International Bureau, International Preliminary Report on Patentability, International Application No. PCT/US2012/050365, which is the PCT parent of the instant application, Feb. 10, 2015.
International Searching Authority, International Search Roport and Written Opinion of the International Searching Authority in PCT/US2012/050365, which is the PCT parent of the instant application, Nov. 2, 2012.
Canadian Intellectual Property Office, Examiner's Requisition, Application No. 2,881,630, which is a CA counterpart of the instant application, Feb. 8, 2016.

\* cited by examiner

NAVIGATING TO FAILURES IN DRILLING SYSTEM DISPLAYS

BACKGROUND

In one embodiment, the equipment used to drill a well to recover hydrocarbons from the Earth is called a drilling system. Drilling control systems and planning tools for drilling operations often display schematics of a drilling system and data describing the operation of the drilling system. It can be a challenge to navigate to the location of failures in such drilling system displays.

DETAILED DESCRIPTION

Figure 1:
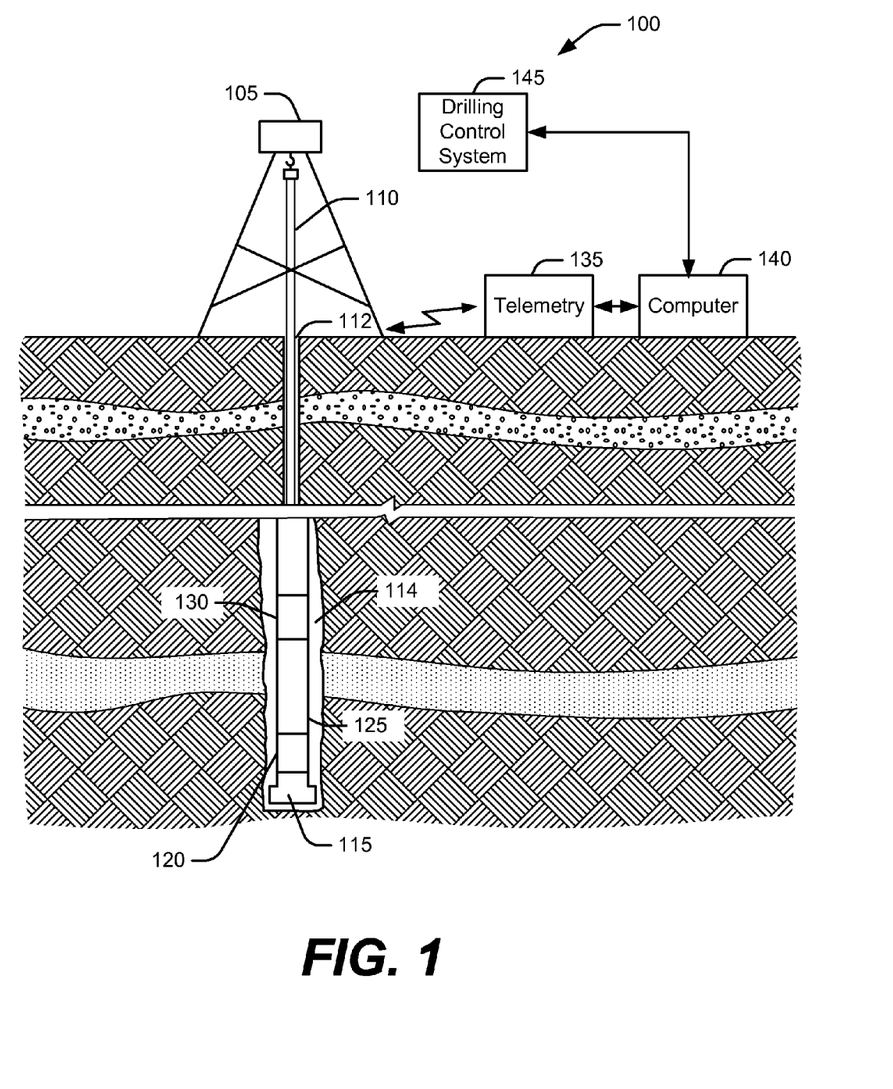
FIG. 1 shows one embodiment of a drilling system.

In one embodiment, a drilling system 100, illustrated in FIG. 1, includes a derrick 105 from which a drill string 110 is suspended in a borehole 112. FIG. 1 is greatly simplified and for clarity does not show many of the elements that are used in the drilling process. Further, while FIG. 1 shows a land-based drilling system, the techniques described herein are also useful in a sea-based drilling system. In one embodiment, the volume within the borehole 112 around the drill string 110 is called the annulus 114. In one embodiment, the drill string includes a bit 115, a variety of actuators and sensors, shown schematically by elements 120 and 125, and a telemetry section 130, through which the downhole equipment communicates with a surface telemetry system 135.

In one embodiment, a computer 140 receives data from the downhole equipment and sends commands to the downhole equipment through the surface telemetry system 135. In one embodiment the computer 140 includes input/output devices, memory, storage, and network communication equipment, including equipment necessary to connect to the Internet.

In one embodiment, the drilling system 100 includes a drilling control system 145 which monitors and controls the drilling system 100. In one embodiment, the drilling control system 145 monitors sensors (not shown) that detect vibrations, weight on bit, and other parameters of the drilling system 100 that can be used, along with data collected from the downhole equipment through the surface telemetry system 135 (which, in one embodiment, it receives from the computer 140) to analyze drilling system 100 failure modes such as fatigue, yield stress, sinusoidal buckling, helical buckling, lockup, and torque failure. In one embodiment, the drilling control system 145 uses the collected data to estimate where in the drilling system such failures have occurred.

In one embodiment, the drilling control system 145 is part of the computer 140. In one embodiment, the drilling control system 145 is a process that runs in the computer 140. In one embodiment, the drilling control system 145 is a separate computer or processor from the computer 140.

Figure 2:
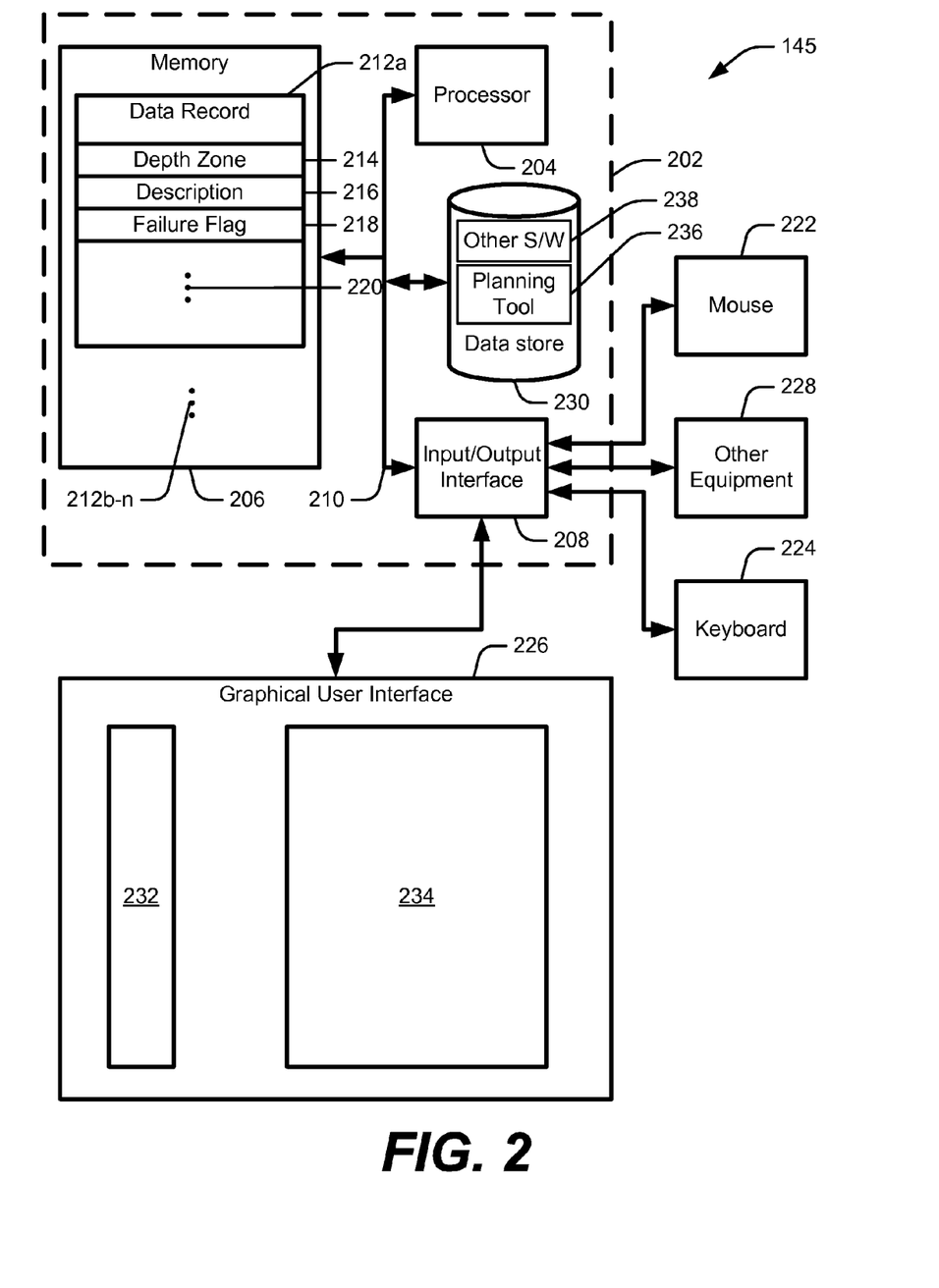
FIG. 2 shows one embodiment of a drilling control system.
Figure 3:
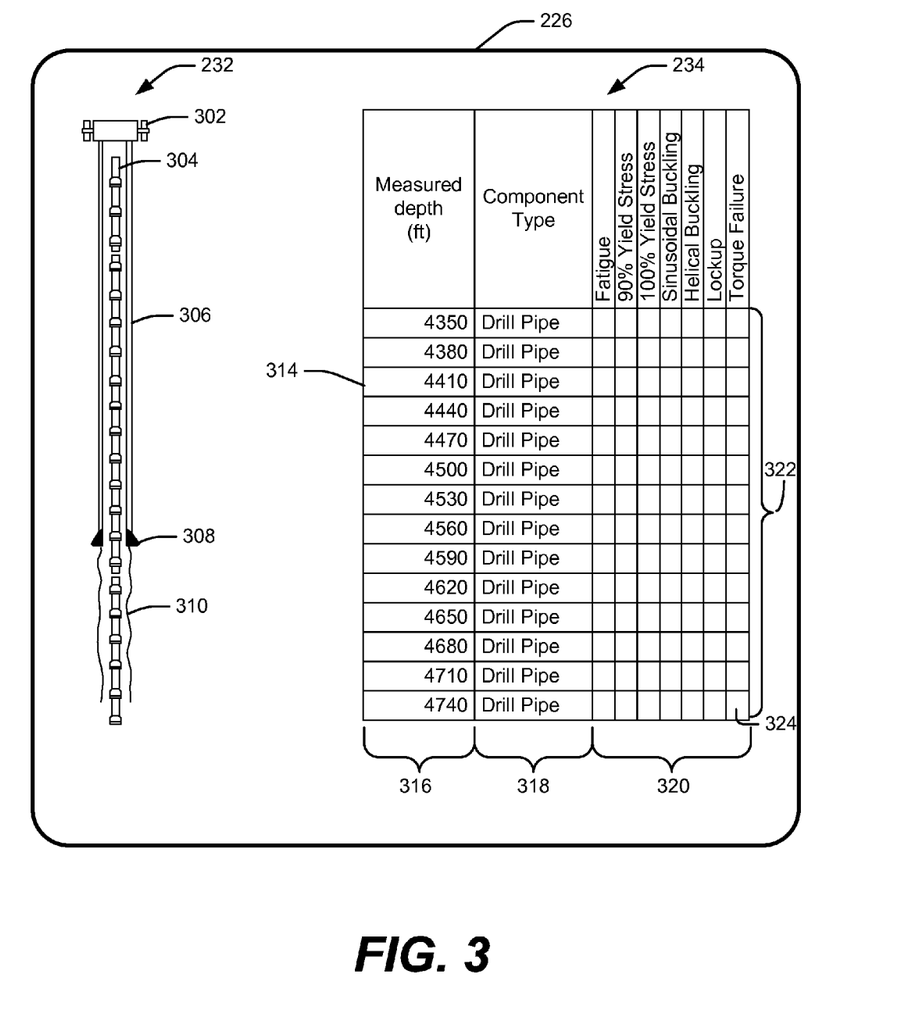
FIGS. 3-6 show one embodiment of a user interface used to navigate to a failure in a display of the drilling system.

In one embodiment, shown in FIG. 2, the drilling control system 145 includes a housing 202 that encloses a processor 204, a memory 206, and an input/output interface 208, all interconnected by a bus 210. The processor 204 has access to the memory 206 and the input/output interface 208 through the bus 210.

The memory 206 stores a plurality of data records 212a-n (data records 212b-n are represented by an ellipsis). Each of the data records 212a-n includes a depth zone field 214, a component description field 216, a failure flag field 218, and other fields represented by ellipsis 220.

In one embodiment, the depth zone field 214 contains data representing a depth zone, which describes a range of depths in a well. In one embodiment, the depths are measured depths. In one embodiment, the depth zone is defined by an upper depth and a lower depth and the range of depths is the depths between the upper depth and the lower depth. In one embodiment, the depth zone is defined by a single depth and the range of depths is the range of depths between the single depth and an offset. In one embodiment, the offset is the same for all data records. In one embodiment, the offset is the same for sets of data records. For example, if the single depth is 3500 feet and the offset is 50 feet, the range of depths is 3500-3550 feet.

In one embodiment, the component description field 216 contains data representing a description of a component in the drill string in the depth zone for the data record. In one embodiment, the component can be any of the components in a drill string including drill pipe, tools, bits, etc. For example, if the depth zone is 4500-4530 feet and the drill string component at that depth is drill pipe, the component description field for the data record 212a-n having that depth would contain a designation representing drill pipe, such as the words "Drill Pipe," an abbreviation of drill pipe, such as "DP," or a code that represents drill pipe.

In one embodiment, the failure flag field 218 is a flag that is set upon detection of a failure in the drill string 110 in the depth zone for the data record 212a. In one embodiment, the failure is one of the failure modes that can be detected by the drilling control system 145 (i.e., fatigue, yield stress, sinusoidal buckling, helical buckling, lockup, and torque failure). In one embodiment, the other fields represented by ellipsis 220 are failure flag fields for one or more of the other failure modes that can be detected by the drilling control system 145.

In one embodiment, the drilling control system 145 includes a mouse 222, a keyboard 224, and a graphical user interface 226 that communicate with the processor 204 through the input/output interface 208. In one embodiment, the mouse 222 is one or more of a standard computer mouse, a graphics tablet or a similar device. In one embodiment, the keyboard 224 is one or more of a standard QWERTY keyboard and a key pad. In one embodiment, the graphical user interface 226 is one or more of a monitor and a television.

In one embodiment, the drilling control system 145 includes other equipment 228 that communicate with the processor 204 through the input/output interface 208. In one embodiment, the other equipment 228 includes standard computer peripherals such as an optical drive, a printer, a modem, a network interface, a wireless network interface, and other similar equipment. In one embodiment, the other equipment 228 includes the sensors described above by which the drilling control system 145 can identify drilling system 100 failure modes. In one embodiment, the other equipment 228 includes the surface telemetry system 135. In one embodiment, the other equipment 228 includes the computer 140.

In one embodiment, the drilling control system 145 includes a data store 230, such as a hard drive or a similar device that is accessible to the processor 204 through the bus 210. In one embodiment, the data store 230 stores an operating system and programs to, among other things, accomplish the functions described in this patent application.

In one embodiment, the processor executes a program stored on the data store 230, gathers data from the other equipment 228, accepts further input from the keyboard 224 and mouse 222, analyzes the collected data, and displays the result on the graphical user interface 226. In one embodiment, the results are displayed in a well schematic display area 232, where a well schematic can be displayed, and a well data display area 234, which displays data collected by the drilling control system 145. It will be understood that other data beyond that shown in FIG. 2 can also be displayed on the graphical user interface 226.

In one embodiment, shown in FIGS. 3-6, the well schematic display area 232 includes a representation of the drill string 110. In the embodiment illustrated in FIGS. 3-6, the well schematic display area 232 includes a well schematic which includes a representation of a well head 302, multiple representations of drill pipe 304 (only one section of drill pipe is labeled), a representation of well casing 306, a representation of a casing shoe 308, and a representation of the borehole wall 310.

In one embodiment, shown in FIGS. 3-6, the well data display area 234 includes a well data table 314, which includes a column for measured depth 316, a column for component type 318, and one or more columns for drill system failures 320. In one embodiment, the one or more columns for drill system failures 320 includes, as indicated by the labels at the top of the one or more columns for drill system failures 320, a column for fatigue, a column for 90% yield stress, a column for 100% yield stress, a column for sinusoidal buckling, a column for helical buckling, a column for lockup, and a column for torque failure. It will be understood that the drill string failures shown in FIGS. 3-6 is merely an example. Other embodiments include other drill system failures. Still other embodiments display fewer drill system failures. Still other embodiments display more drill system failures.

In one embodiment, the one or more columns of the well data table 314 are divided into depth zone rows 322. In one embodiment, the content of each of the cells in the resulting matrix of cells, where each cell is the intersection of a row and a column, corresponds to the presence or absence of the drill system failure associated with the intersecting column at the measured depth zone associated with the intersecting row. In one embodiment, an empty or blank cell indicates that the drill system failure associated with the column that intersects at that cell is not present at the depth associated with the row that intersects at that cell and the presence of a value, such as an "x," indicates that the corresponding fault has occurred at the corresponding depth. For example, in one embodiment, cell 324 represents the presence or absence of the drill system failure "torque failure" at measured depth 4740-4770 feet (in the example, each row corresponds to a range of 30 feet of measured depth). The fact that cell 324 is empty indicates that the drilling system 100 has not experienced torque failure at measured depth 4740-4770 feet. If cell 324 contained a value, such as an "x," that would indicate that the drilling system 100 had experienced torque failure at measured depth 4740-4770 feet.

In one embodiment, each of the depth zone rows 322 corresponds to data contained in one data record 212*a-n*. In one embodiment, the measured depth column 316 contains a representation of the data contained in the depth zone field 214 of a corresponding data record 212*a-n*. In one embodiment, the component type column 318 contains a representation of the component description field 216. In one embodiment, the drill system failure fields 320 contain a representation of the data contained in the failure flag field 218 and the other failure flag fields contained in the other fields 220 of a corresponding data record 212*a-n*.

In one embodiment, if a fault (or faults) occurs in the drilling system 100, the processor 204 receives data from the other equipment 228 through the input/output interface 208 and interprets the data to identify the fault (or faults) and the location of the fault (or faults) in the drilling system 100. In one embodiment, the processor 204 will set the flags in the failure flag field 218 or the other fields 220 corresponding to the identified fault (or faults) in the data record or data records 212*a-n* that correspond to the location of the identified fault (or faults). For example, if the processor 204 determines that the drill string 110 is experiencing sinusoidal buckling at 4530 feet of measured depth, in one embodiment the processor 204 will set the failure flag field 218 or other field 220 associated with the sinusoidal buckling failure in the data record 212*a-n* which has a depth zone field 214 that includes 4530 feet.

In another embodiment, the data records 212*a-n* are populated by a planning tool 236 (see FIG. 2), and may not be associated with a real-time drilling operation. In one embodiment, the planning tool 236 is software stored on the data store 230 (along with other software 238) that is executed by the processor 204. In one embodiment, the output of the planning tool 236 is displayed on the graphical user interface 226, and its inputs are provided through the mouse 222 and keyboard 224. In one embodiment, the planning tool 236 allows a user to vary drilling system parameters such as fluids, rotation speed, weight on bit, etc. for a drilling system 100 being modeled. The planning tool 236 will predict the type and location of a drill system failure (or failures) under those circumstances. In one embodiment, the planning tool 236 sets the flags in the failure flag field 218 or the other fields 220 corresponding to the identified fault (or faults) in the data record or data records 212*a-n* that correspond to the location of the identified fault (or faults). For example, if the planning tool 236 predicts that the drill string 110 will experience sinusoidal buckling at 4530 feet of measured depth, in one embodiment the planning tool 236 will set the failure flag field 218 or other field 220 associated with the sinusoidal buckling failure in the data record 212*a-n* which has a depth zone field 214 that includes 4530 feet.

Figure 4:
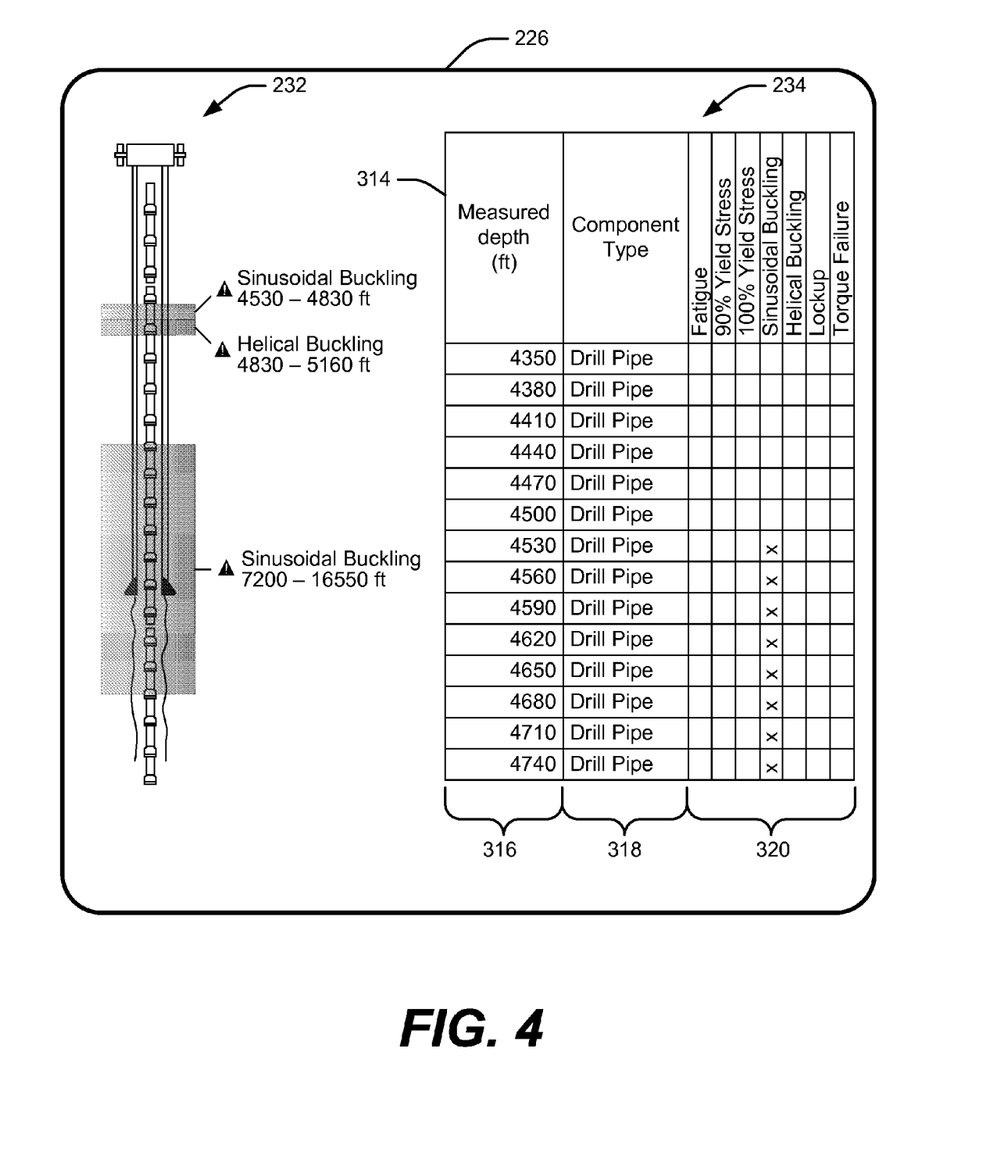

In one embodiment, the processor then causes the portion of the graphical user interface's 226 well schematic display area 232 where the fault occurred (i.e., where the failure flag field 218 or the other failure fields 220 have been set) to be shaded as shown in FIG. 4. In one embodiment, the processor causes an alarm icon, such as a triangle with an overlaid exclamation point, and text indicating the type of failure and details of the depth where the failure occurred to be displayed on the graphical user interface 226 adjacent to the shaded areas. For example, in the embodiment shown in FIG. 4, the depth zones representing 4530-4830, 4830-5160, and 7200-16550 feet have been shaded. In addition, an alarm icon and the text "Sinusoidal Buckling 4530-4830 ft" is displayed adjacent to the 4530-4830 foot shaded area, an alarm icon and the text "Helical Buckling 4830-5160 ft" is displayed adjacent to the 4830-5160 foot shaded area, and an alarm icon and the text "Sinusoidal Buckling 7200-16550 ft"

is displayed adjacent to the 7200-16550 foot shaded area. Further, the cells representing "Sinusoidal Buckling" for the depth range 4530 through 4740 in the well data table 314 display an "x" indicating that sinusoidal buckling is occurring in that depth range. The depth range where sinusoidal buckling is occurring extends off the bottom of the page.

Figure 5:
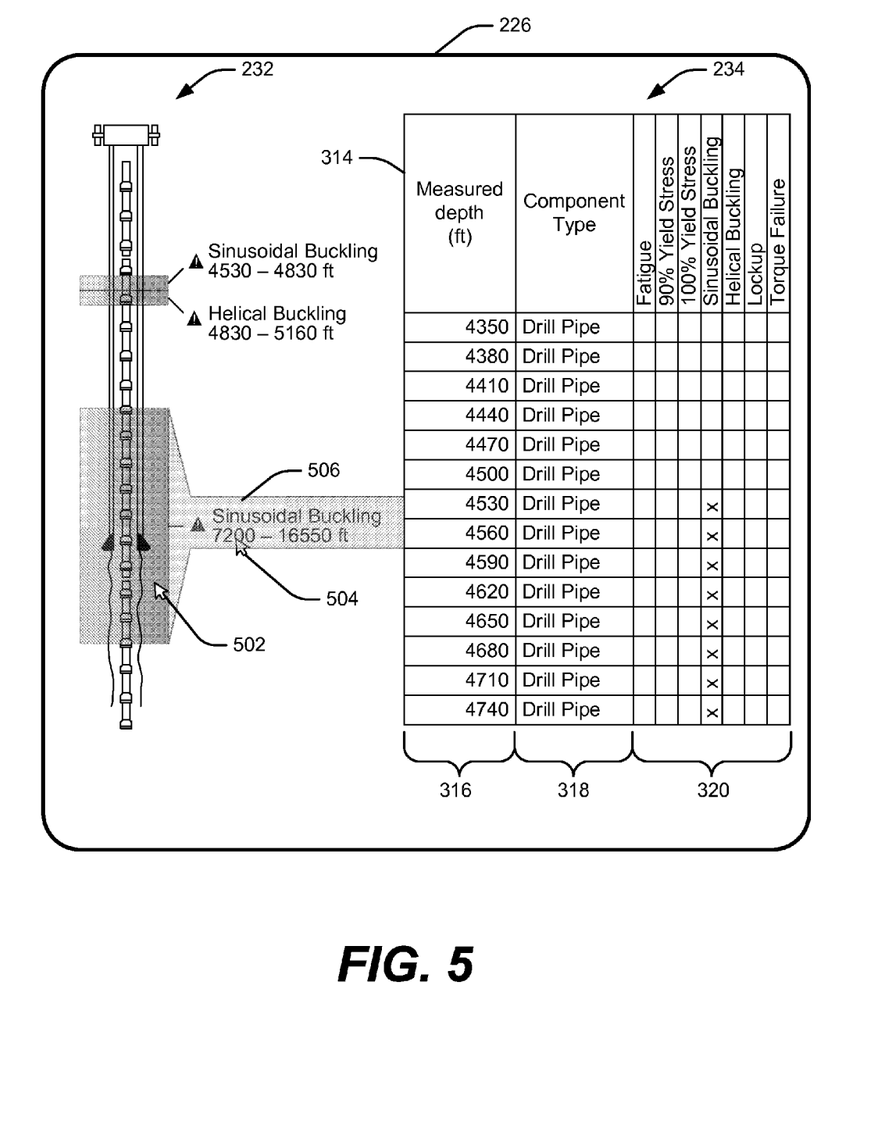

In one embodiment, illustrated in FIG. 5, moving the mouse 222 so that its cursor appears over a zone in the well schematic display area 232 where an error has occurred, or over the text associated with the error, is detected by the processor 204 and the processor 204 causes highlighting to appear on the graphical user interface 226. For example, in one embodiment, moving the mouse to position 502 over the 7200-16550 foot zone in the well schematic display area 232 or to position 504 over the text describing the error that has been reported for that zone, causes those areas to be highlighted by, for example, changing the color of the 7200-16550 foot zone or changing a degree of transparency associated with the existing shading and adding additional shading 506 over the alarm icon and text.

Figure 6:
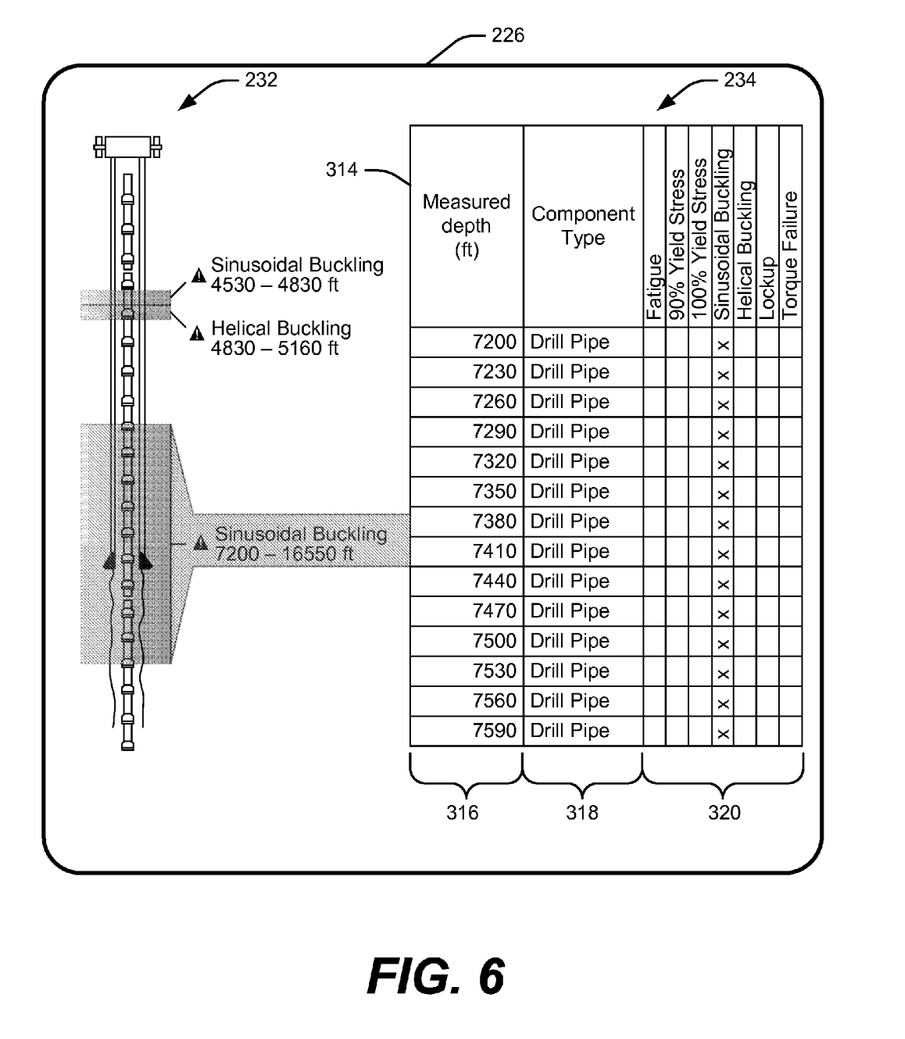

In one embodiment, illustrated in FIG. 6, clicking the mouse 222 when it is in one of the positions 502 and 504 shown in FIG. 5 is detected by the processor 204 and the processor causes the well data table 314 to be scrolled on the graphical user device 226 until the data associated with the selected zone is displayed. In the example shown in FIG. 6, in one embodiment, the well data table 314 has scrolled from the position shown in FIG. 5 to the position shown in FIG. 6 in which the data from measured depth from 7200 through 7590 feet is displayed.

Figure 7:
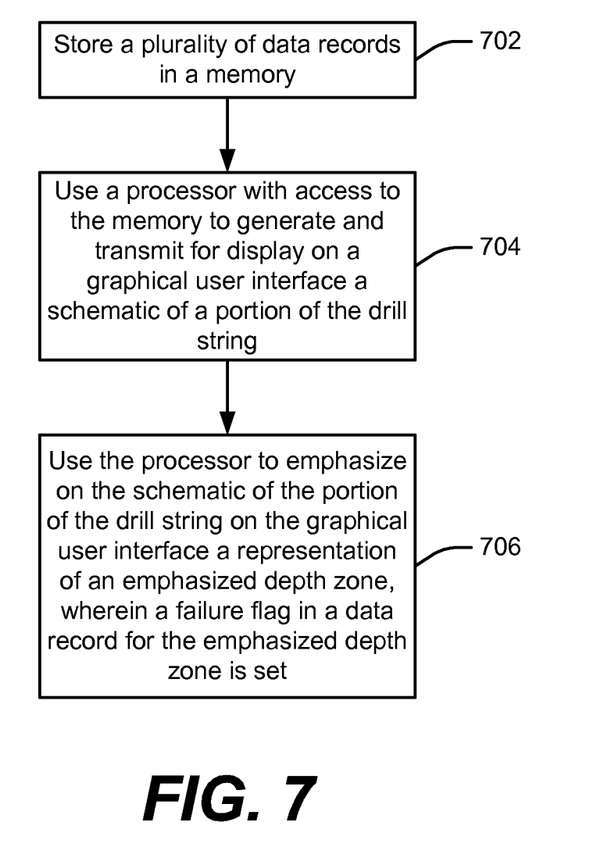
FIG. 7 is a flow chart.

In use, in one embodiment, as shown in FIG. 7, the drilling control system 145 stores a plurality of data records 212a-n in a memory 206 (block 702). In one embodiment, the data records comprise data about a drill string 110 in a well borehole 112. In one embodiment, each data record includes a depth zone, wherein the depth zone comprises a range of depths in the well. In one embodiment, each data record includes a description of a component in the drill string in the depth zone for this data record. In one embodiment, each data record includes a failure flag that, when set, represents a failure in the drill string at the depth zone for this data record.

In one embodiment, the drilling control system 145 uses the processor 204 with access to the memory 206 to generate and transmit for display on a graphical user interface 226 a schematic of a portion of the drill string 110 (block 704). In one embodiment, the schematic is displayed in a well schematic display area 232 of the graphical user interface 226.

In one embodiment, the drilling control system 145 uses the processor 204 to emphasize on the schematic of the portion of the drill string on the graphical user interface 226 a representation of an emphasized depth zone, wherein a failure flag in a data record 212a-n for the emphasized depth zone is set (block 706). In one embodiment, the failure flag is stored in a failure flag field 218 in a data record 212a-n.

Figure 8:
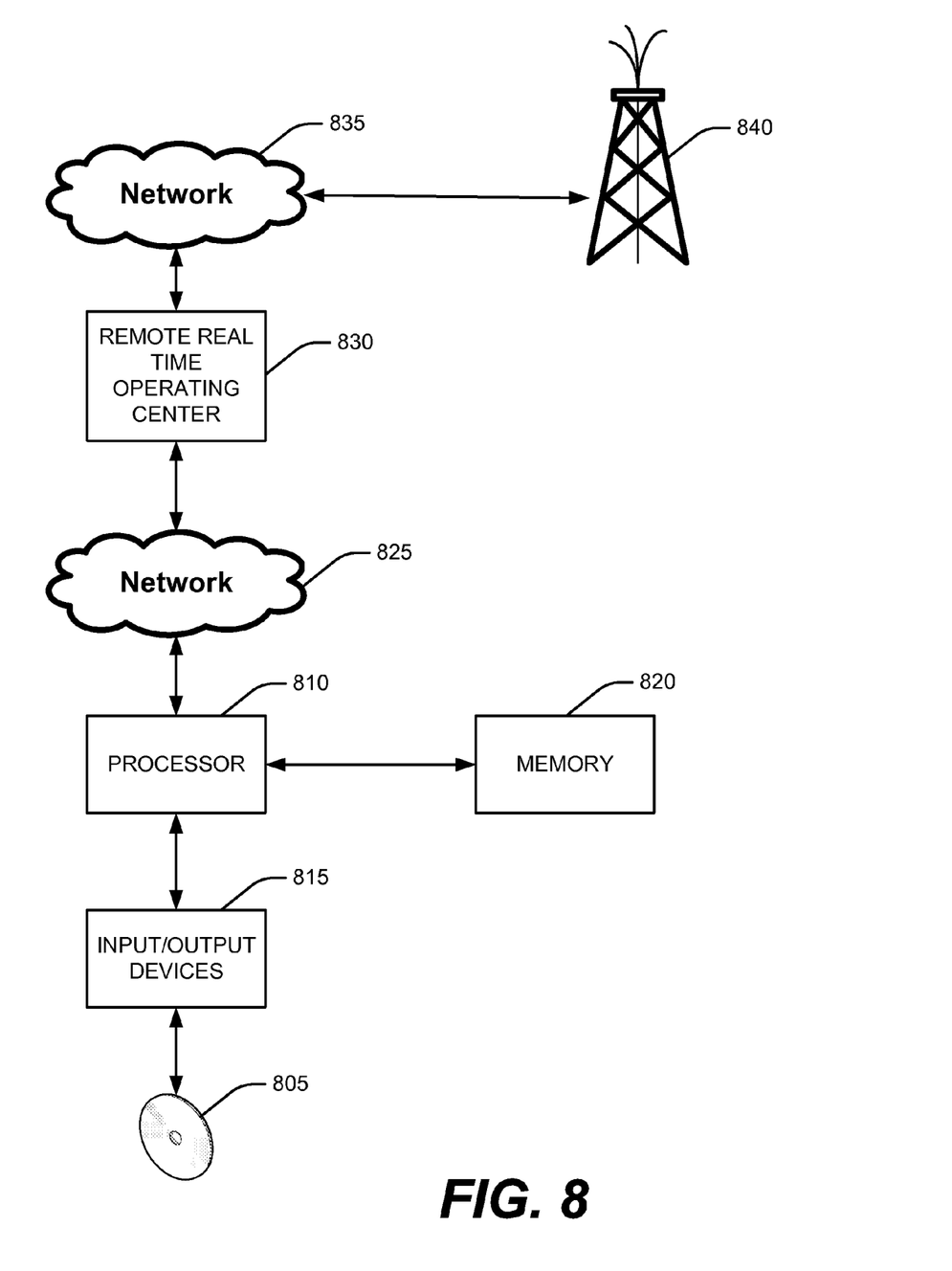
FIG. 8 shows one embodiment of an environment for the drilling system.

In one embodiment, shown in FIG. 8, the drilling control system 145 is controlled by software in the form of a computer program on a computer readable media 805, such as a CD, a DVD, a portable hard drive or other portable memory. In one embodiment, a processor 810, which may be the same as or included in the processor 204, reads the computer program from the computer readable media 805 through an input/output device 815 and stores it in a memory 820 where it is prepared for execution through compiling and linking, if necessary, and then executed. In one embodiment, the system accepts inputs through an input/output device 815, such as a keyboard or keypad, and provides outputs through an input/output device 815, such as a monitor or printer. In one embodiment, the system stores the results of calculations in memory 820 or modifies such calculations that already exist in memory 820.

In one embodiment, the results of calculations that reside in memory 820 are made available through a network 825 to a remote real time operating center 830. In one embodiment, the remote real time operating center 830 makes the results of calculations available through a network 835 to help in the planning of oil wells 840 or in the drilling of oil wells 840.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   storing a plurality of data records in a memory, wherein the data records comprise data about a drill string in a well and wherein each data record comprises:
     a depth zone, wherein the depth zone comprises a range of depths in the well,
     a description of a component in the drill string in the depth zone for the data record, and
     a failure flag that, when set, represents a failure in the drill string at the depth zone for the data record;
   setting a failure flag for a data record for a depth zone when a change by a user to a drilling system parameter results in the failure in the drill string at the depth zone;
   using a processor with access to the memory to generate and transmit for display on a graphical user interface a schematic of a portion of the drill string; and
   using the processor to emphasize on the schematic of the portion of the drill string on the graphical user interface a representation of an emphasized depth zone, wherein a failure flag in a data record for the emphasized depth zone is set; and
   wherein, when emphasizing the representation of the emphasized depth zone, the processor displays text adjacent to the representation of the emphasized depth zone on the graphical user interface, the text indicating a type of failure and a range of depths at which the failure in the drill string occurred.

2. The method of claim 1 wherein, when emphasizing the representation of the emphasized depth zone, the processor shades the representation of the emphasized depth zone on the graphical user interface.

3. The method of claim 1 further comprising:
   the processor detecting the movement of a cursor over the text indicating the type of failure on the graphical user interface; and, as a result:
   the processor highlighting the representation of the emphasized depth zone on the schematic of the portion of the drill string on the graphical user interface.

4. The method of claim 1 further comprising:
   the processor detecting the movement of a cursor over the representation of the emphasized depth zone on the schematic of the portion of the drill string on the graphical user interface; and, as a result:

the processor highlighting the representation of the emphasized depth zone on the schematic of the portion of the drill string on the graphical user interface.

5. The method of claim 1 further comprising:

the processor detecting a selection of the representation of the emphasized depth zone on the schematic of the portion of the drill string on the graphical user interface; and, as a result:

the processor displaying on the graphical user interface data from the data record for the emphasized depth zone.

6. The method of claim 1 further comprising:

the processor detecting a selection of the representation of the emphasized depth zone on the schematic of the portion of the drill string on the graphical user interface; and, as a result:

the processor displaying on the graphical user interface data from the data record for the emphasized depth zone and data for depth zones adjacent to the emphasized depth zone.

7. A computer program stored in a non-transitory computer readable storage medium, the computer program comprising executable instructions that cause a processor to:

store a plurality of data records in a memory, wherein the data records comprise data about a drill string in a well and wherein each data record comprises:
 a depth zone, wherein the depth zone comprises a range of depths in the well,
 a description of a component in the drill string in the depth zone for the data record, and
 a failure flag that, when set, represents a failure in the drill string at the depth zone for the data record;
 setting a failure flag for a data record for a depth zone when a change by a user to a drilling system parameter results in the failure in the drill string at the depth zone;

generate and transmit for display on a graphical user interface a schematic of a portion of the drill string; and emphasize on the schematic of the portion of the drill string on the graphical user interface a representation of an emphasized depth zone, wherein a failure flag in a data record for the emphasized depth zone is set; and wherein, when emphasizing the representation of the emphasized depth zone, the processor displays text adjacent to the representation of the emphasized depth zone on the graphical user interface, the text indicating a type of failure and a range of depths at which the failure in the drill string occurred.

8. The computer program of claim 7 wherein, when emphasizing the representation of the emphasized depth zone, the processor shades the representation of the emphasized depth zone on the graphical user interface.

9. The computer program of claim 7 further comprising executable instructions that cause the processor to:

detect the movement of a cursor over the text indicating the type of failure on the graphical user interface; and, as a result:

highlight the representation of the emphasized depth zone on the schematic of the portion of the drill string on the graphical user interface.

10. The computer program of claim 7 further comprising executable instructions that cause the processor to:

detect the movement of a cursor over the representation of the emphasized depth zone on the schematic of the portion of the drill string on the graphical user interface; and, as a result:

highlight the representation of the emphasized depth zone on the schematic of the portion of the drill string on the graphical user interface.

11. The computer program of claim 7 further comprising executable instructions that cause the processor to:

detect a selection of the representation of the emphasized depth zone on the schematic of the portion of the drill string on the graphical user interface; and, as a result:

display on the graphical user interface data from the data record for the emphasized depth zone.

12. The computer program of claim 7 further comprising executable instructions that cause the processor to:

detect a selection of the representation of the emphasized depth zone on the schematic of the portion of the drill string on the graphical user interface; and, as a result:

display on the graphical user interface data from the data record for the emphasized depth zone and data for depth zones adjacent to the emphasized depth zone.

13. A system comprising:

a memory operable to store a plurality of data records, wherein the data records comprise data about a drill string in a well and wherein each data record comprises:
 a depth zone, wherein the depth zone comprises a range of depths in the well,
 a description of a component in the drill string in the depth zone for the data record, and
 a failure flag that, when set, represents a failure in the drill string at the depth zone for the data record;
 setting a failure flag for a data record for a depth zone when a change by a user to a drilling system parameter results in the failure in the drill string at the depth zone;

a processor with access to the memory, the processor operable to:
 generate and transmit for display on a graphical user interface a schematic of a portion of the drill string; and emphasize on the schematic of the portion of the drill string on the graphical user interface a representation of an emphasized depth zone, wherein a failure flag in a data record for the emphasized depth zone is set; and wherein, when emphasizing the representation of the emphasized depth zone, the processor displays text adjacent to the representation of the emphasized depth zone on the graphical user interface, the text indicating a type of failure and a range of depths at which the failure in the drill string occurred.

14. The system of claim 13 wherein, when emphasizing the representation of the emphasized depth zone, the processor is operable to shade the representation of the emphasized depth zone on the graphical user interface.

15. The system of claim 13 wherein the processor is operable to:

detect the movement of a cursor over the text indicating the type of failure on the graphical user interface; and, as a result:

highlight the representation of the emphasized depth zone on the schematic of the portion of the drill string on the graphical user interface.

16. The system of claim 13 wherein the processor is operable to:

detect the movement of a cursor over the representation of the emphasized depth zone on the schematic of the portion of the drill string on the graphical user interface; and, as a result:

highlight the representation of the emphasized depth zone on the schematic of the portion of the drill string on the graphical user interface.

17. The system of claim 13 wherein the processor is operable to:

detect a selection of the representation of the emphasized depth zone on the schematic of the portion of the drill string on the graphical user interface; and, as a result:

display on the graphical user interface data from the data record for the emphasized depth zone.

* * * * *